United States Patent [19]
Tucker

[11] Patent Number: 5,926,248
[45] Date of Patent: Jul. 20, 1999

[54] SUNGLASS LENS LAMINATE

[75] Inventor: John F. Tucker, Rochester, N.Y.

[73] Assignee: Bausch & Lomb, Incorporated, Rochester, N.Y.

[21] Appl. No.: 09/105,518

[22] Filed: Jun. 26, 1998

[51] Int. Cl.$^6$ ...................................................... G02C 7/10
[52] U.S. Cl. ................................................ 351/44; 351/163
[58] Field of Search ........................... 351/44, 163, 165, 351/177

[56] References Cited

U.S. PATENT DOCUMENTS

| | | | |
|---|---|---|---|
| 4,227,950 | 10/1980 | Spycher | 156/85 |
| 4,883,548 | 11/1989 | Onoki | 351/163 |
| 5,135,298 | 8/1992 | Feltman | 351/163 |
| 5,323,191 | 6/1994 | Firtion | 351/159 |
| 5,351,100 | 9/1994 | Schwenzfeier | 351/164 |
| 5,364,487 | 11/1994 | Friske | 156/309.9 |
| 5,618,863 | 4/1997 | D'Errico | 524/91 |
| 5,751,481 | 5/1998 | Dalzell et al. | 351/163 |

*Primary Examiner*—Huy Mai
*Attorney, Agent, or Firm*—Katherine McGuire; Craig E. Larson; Mary Anne Magee

[57] ABSTRACT

An improved sunglass lens laminate having first and second lens portions joined by an adhesive, wherein the adhesive contains sufficient ultraviolet absorber to block substantially all of the UVA radiation in sunlight. In a preferred embodiment, a polarizing film is disposed between two lens portions to form a polarizing sunglass lens laminate.

21 Claims, No Drawings

SUNGLASS LENS LAMINATE

BACKGROUND OF THE INVENTION

This invention relates to sunglass lenses, both prescription and nonprescription, and more particularly relates to sunglass lenses having a laminated construction.

Sunglasses have been used for many years as cosmetic devices and to reduce the intensity of visible light. More recently they have come to be seen as important in protecting a wearer's eyes from harmful rays of the sun. In particular, exposure to light having ultraviolet (UV) rays can cause irreparable damage to the eye. Visible light ranges from about 380 to 700 nanometer. Opinions sometime differ as to the exact boundaries of this range. For example, some consider 400 nanometers to be the lower end of the range. We will consider 380 nanometers to be the lower end of the range in this specification. Wavelengths shorter than 380 nanometers fall below the visible light spectrum and represent the ultraviolet light spectrum. Wavelengths from 290 to 315 nanometers as known as UVB and can cause more damage than those in the range of 315 to 380 nanometers, known as UVA. Excessive exposure of the eyes to ultraviolet rays can damage the cornea and lens of the eye. Lifetime exposure to ultraviolet contributes to some types of cataracts. Additionally, the lens shields the light sensitive retina at the back of the eye from UV rays.

The lenses of higher quality sunglasses contain UV absorbers to protect the wearer's eyes from these damaging rays. UV absorbers are often included in the glass or plastic material used to make the lenses. They have also been included in lens coatings and, in the case of polarized lenses discussed in more detail below, in polarizing film laminated into the lens structure.

Sunglasses are familiar devices generally constructed from a frame and one or more lenses. The lenses may be glass or plastic. These lens materials may contain light absorbing dyes and ultraviolet inhibiting chemicals and may have one or more coatings applied to the lens after it is formed.

While most sunglass lenses have a unitary construction in that they are formed from a single piece of lens material, laminates have also been used as sunglass lenses. One type of laminate lens includes glass-plastic composite lenses. The idea of such lenses is to combine the light weight of a plastic lens with the superior surface and optical qualities of glass. Examples of such composite lenses are found in U.S. Pat. Nos. 4,227,950, 5,323,191, and 5,364,487. These composites are usually formed by bonding preformed glass and plastic elements with an adhesive (although U.S. Pat. No. 4,227,950 teaches casting the plastic lens element against a preformed glass lens element). Also see U.S. Pat. No. 5,351,100, which shows a glass multifocal ophthalmic lens formed by fusing a glass multifocal lens portion to the convex outer surface of a second lens portion.

A distinct class of sunglass lens laminates is those incorporating polarizing films. Light waves from the sun are random non-polarized waves which will reflect off a flat surface to become directional, or polarized. Glare is an example of light waves that have been restricted to one plane. Polarized sunglasses are effective at cutting surface reflection from flat surfaces such as water, ice, or roads. Polarizing lenses typically will have a polarizing layer laminated between two lens portions. Polarized sunglasses filter out glare, ultraviolet waves and other random light by use of a polarized light filtering film commonly made of polyvinyl alcohol dyed with iodine. This film is constructed so that its crystal molecules are aligned in parallel lines. Light waves perpendicular to the plane of the crystals are blocked and light waves in the same plane as the crystals pass through the membrane. See U.S. Pat. No. 5,135,298.

Some adhesives used in lamination of lens portions have low concentrations of UV absorbers. Addition of a UV absorber will keep the adhesive from yellowing upon exposure to UV light. The concentration of the absorber will be low. See U.S. Pat. No. 5,618,863.

There are many commercial examples of polarized lenses on the market. One type includes lenses that consist of two tempered clear glass lens portions. Another type includes lenses that consist of one front tempered clear glass and an untempered colored rear glass. This particular commercial lens may have a mirror surface on the external convex surface and an antireflective coating on the external concave surface. Color may be added to the polarizing film and may also be incorporated into the rear lens. Another type of commercial lens has a clear and untempered front glass with the rear glass lens being clear and tempered. The mirror is on internal front lens surface with the antireflective surface on external rear surface. Color is in the polarizing film only. The laminates containing the polarizing film are usually prepared using an adhesive curable with ultraviolet light.

The manufacture of currently available polarizing lenses is a complex, time-consuming procedure with inconsistent results. Multiple lens portions must be kept in inventory and a high quantity of lenses failing quality tests leads to high costs. Furthermore, the polarization efficiency of the lens laminates degrades unacceptably as a result of exposure to ultraviolet light during use.

SUMMARY OF THE INVENTION

The inventor has found that laminates used as sunglass lenses can be improved by incorporating ultraviolet absorber into the adhesive used to form the laminate, the amount incorporated being sufficient to block substantially all of the UVA radiation present in sunlight. Many advantages flow from use of this kind of adhesive, some of which will be apparent to those skilled in the art. For example, the adhesive may be used to supplement the UV-absorption capacity of other components of the laminate.

Particular advantages of this invention are found, however, when UV absorber-containing adhesives are used to prepare laminates containing a polarizing film. The polarizing film in the laminates of this invention is encased in UV-absorbing layers, protecting the polarizing film and minimizing the degradation of polarization efficiency due to exposure to UV-containing light. In embodiments where the polarizing film also includes dyes to reduce the intensity of visible light and to provide desired cosmetic effects, the UV-absorbing layers formed by the cured adhesive of this invention reduce fading and lengthen the useful life of the sunglass lens.

Other lens quality improvements result from the improved manufacturing processes made possible by this invention. The lenses of this invention comprise first and second lens portions joined by an adhesive containing ultraviolet absorber. In previously known lens laminates wherein one of the lens portions has ultraviolet-absorbing properties and wherein a ultraviolet-cured adhesive is used to make the laminate, proper cure of the adhesive is difficult to achieve because of the effect of the ultraviolet-absorbing lens portion on the cure process. Making lenses using the methods described below allows faster, more uniform curing of the adhesive and results in higher quality product.

In another, distinct aspect of this invention, the inventor has found that the use of visible light initiators to cure the adhesive in the lens laminate surprisingly increases lens quality, produces better finished lens optics, and significantly increased manufacturing yields. This aspect of the invention has particular value in the production of polarizing sunglass lenses. The tendency of the polarizing film to wrinkle during assembly and cure of the laminate structure is an aggravating problem encountered when polarizing film is incorporated in lens laminates. Use of visible light initiators in the adhesive and use of visible light radiation during cure minimizes the wrinkling problem encountered with other techniques.

Related to the use of visible light initiators in the adhesive is the importance of avoiding overheating of the laminate structure during the cure process, and especially during the initial portions of the cure process. In this regard, best results will be obtained if the temperature of the laminate during cure is less than 140° F., more preferably less than 120° F.

DETAILED DESCRIPTION

The lens portions used in this invention may be made from any material known to be useful for making sunglass lenses. Any of the known plastic or glass lens materials are useful for use in this invention. As will be apparent to those skilled in the art, the laminates may be designed as piano lenses or they may be designed to have optical power for refractive correction. Coatings may be applied to lens portions, either before or after formation of the laminate. Coatings are preferably applied after formation of the laminate.

Selection of adhesives useful in making the lens laminates of this invention is within the skill of the art. Generally preferred adhesives will be chemically compatible with the other components of the laminate, will have the same or substantially similar index of refraction as that of the lens portions, and will have a high transparency and a high degree of color fastness. The adhesive is preferably provided in a liquid form and should be compatible and capable of dissolving the ultraviolet absorber. In the lens embodiment incorporating a polarizing film in the core of the laminate, the adhesive will preferably protect the polarizing core from corrosive chemical environments. The adhesives may be curable by ultraviolet light, visible light, heat, sealing pressure or by any combination of thereof. Preferably the adhesive contains a photoinitiator (activated by either UV or visible light). The use of visible light initiators is particularly preferred. Use of heat and pressure to cure the adhesive is unsuitable for fragile laminate components such as glass and polarizing film. It is especially important to avoid high temperatures during the cure cycle when incorporating a polarizing film into the lens laminate. Preferably, the temperature during cure will not exceed about 140° when polarizing film is incorporated into the laminate. More preferably, the temperature during cure will not exceed about 120° F.

Adhesives useful in the laminates of this invention include methacrylates, epoxies, polyurethanes, poly(vinyl) acetals, and poly(vinyl) butyrals. Urethane modified acrylic adhesives are presently preferred adhesives. This latter type of adhesive is illustrated in the following examples.

The adhesive will preferably be completely solid upon curing and should be compatible with the lens portions being laminated. Additionally, it is necessary that no the release of volatiles during curing should be avoided in order to prevent formation of bubbles between the components of the lens laminate. The adhesive should also have a consistency such that it can be applied to the lens portion and will not diffuse to the edges too quickly. A reasonable viscosity for efficient application of the adhesive is between 500 and 1500 cps (as measured by a Brookfield viscometer).

By using a combination of UV and visible light to cure the adhesive, less heat is generated and the temperature is more controlled than when UV alone is used. The negative effects of heat such as the wrinkling of polarizing film are avoided. Moreover, the time required for a complete cure is substantially less. By forming a laminate having optically clear glass on both sides of the polarized film, the adhesive can be cured on both sides to achieve a uniform curing in a short period of time. The inventor has discovered that excessive heat can be generated when employing commercial adhesives, particularly urethane modified acrylic adhesives, containing UV initiators. The problem of excessive heat is minimized-and cure time is reduced—by adding visible light initiators to the adhesive and by using visible light to cure the adhesive.

Selecting the amount of initiator employed in the adhesive is within the skill of the art. Commercial forms of the currently preferred urethane modified acrylic adhesives are commonly provided with UV initiators. One highly preferred adhesive is such a commercial adhesive supplemented with added visible light photoinitiator. The amount of visible light photoinitiator added is not narrowly critical, although concentrations within the range of 0.5 to 1.5% by weight have been found to give desirable results. Another highly preferred adhesive is one containing only visible light photoinitiator. However, the commercial availability of such adhesives which are also compatible with other components of the lens laminate is restricted.

Selection of the UV absorber included in the adhesive employed to form the laminate of this invention is not narrowly critical. The absorber should of course be uniformly distributed or dissolved in the adhesive and should be chemically compatible with the other adhesive components. With this qualification, any of the UV absorbers known to be useful for sunglass lenses may be used in the lens laminates of this invention. Presently preferred absorbers are benzotriazoles and benzotriazole derivatives.

The amount of UV absorber included in the adhesive should be sufficient, after formation of the lens laminate, to block substantially all of the ultraviolet radiation, preferably all of the UVA radiation, present in sunlight. Preferably, more than 99.9% of UVA radiation will be blocked by the lens laminates of this invention. UVA absorption of lenses are determined by methods established by the American National Standards Institute (ANSI Z80.3-1996). The upper limit of the amount of absorber included will be determined by the solubility limit of the particular absorber selected in the adhesive. Presently preferred UV absorber concentrations in the adhesive used to form the lens laminates are within the range from about 1.25 to about 5, more preferably from about 1.5 to about 2.5% by weight.

Like the other components of the lens laminate of this invention, selection of the polarizing film is within the skill of the art and is not narrowly critical to this invention. Any of the polarizing film known to be useful for making sunglass lenses may be used to make the laminates of this invention. Currently preferred polarizing film is a polyvinyl alcohol and iodine film. The film may come as a disk with a certain base curve which can be cut to the right diameter for incorporation into the lens laminate. Additionally, the polarizing film may contain dyes to impart various colors to the lens laminate and to adjust the visible light transmittance characteristics of the lens. Films are currently available in wide range of colors and transmittances.

Manufacture of the lens laminates of this invention is illustrated in the following examples and will be further illustrated here by a description of a preferred process for making the polarizing lens laminates of this invention. Two suitable lens portions and a polarizing film are selected and prepared for lamination by shaping and cleaning using methods familiar to those skilled in the art. Adhesive is placed on the inner surfaces of the two lens portions and on both surfaces of the polarizing film. The components of the laminate are assembled and allowed to stand for a time sufficient for the adhesive to spread across the surfaces of the component. The assembly is then pressed to even out the adhesive thickness and assure a uniform contact between the laminate components. The adhesive of the pressed assembly is then cured by exposure to the appropriate initiating energy. For example, when using the preferred urethane modified acrylic adhesive containing a combination of UV and visible light photoinitiators, curing may be accomplished by exposing each side of the assembly to about 1.5 joules UVA per cubic centimeter, 0.47 joules UVB per cubic centimeter, and 0.74 joules visible light per cubic centimeter. To assure completeness of cure, a post cure has been found desirable. Again, when using the preferred urethane modified acrylic adhesive with UV and visible light photoinitiators, the post cure may be accomplished by exposing each side of the laminate to 6.6 joules UVA per cubic centimeter, 2.0 joules UVB per cubic centimeter, and 3.2 joules visible light per cubic centimeter. The foregoing description including that of the curing procedure is merely illustrative of the techniques that may be used to form the lens laminates of this invention.

EXAMPLES

Preparation of Lenses

An adhesive is prepared from Loctite® 3491, a urethane modified acrylic containing a UV initiator (1–3% by weight). To the Loctite® 3491 is added 0.5% Irgacure® 819 (visible light initiator) and 1.5% Tinuvin® 328 (UV absorber). Irgacure® 819 is a phenylbis(2,4,6-trimethyl benzoyl)-phosphine oxide available from Ciba-Geigy (CASRN: 162881-26-7). Tinuvin® 328 is 2-(2-Hydroxy-3, 5-di-tert-amylphenyl)benzotriazole (CAS #25973-55-1) available from Ciba-Geigy. Polarizing film from Yamato International is cut into circular forms with a 1.378 inch radius. These forms are blown off with an ionizing air gun. Lens portions are prepared from S3 glass blanks obtained from Schott Glass. The blanks are ground to shape, polished, tempered, and ultrasonically cleaned and rinsed.

A "laminate stack" is made with two S3 glass lens portions having the polarizing film between them. The "laminate stack" is opened and 0.12 to 0.14 gram of the adhesive is dispensed to the concave side of the outer lens portion. The same amount of adhesive is dispensed to the convex side of the polarizing film. After the film is laid down on the outer lens, 0.12 to 0.14 gram of adhesive is dispensed to the concave side of the film. The same amount of adhesive is dispensed to the convex side of the inner lens portion. The inner lens portion is then laid on the film. The laminate stack rests with the concave side up to allow adhesive to wick to the edge of the lens (approximately 5 minutes). After the adhesive has completely spread to the outer edges, the laminate stack is pressed (at 60 psi) for 10 seconds.

Curing is done by exposing the lens stack to a Fusion D lamp (Fusion UV System, Inc.). The Fusion D lamp emits UVA,UVB, and visible radiation. Exposure is accomplished by placing the lens stack on a conveyor belt 2 inches from the UV lamp and by setting the belt speed so that the lens is exposed for 5 seconds per pass. After the first pass, the lens stack is turned over and the other side is exposed for the same amount of time.

Lenses are cleaned and inspected for defects.

Testing of Lenses

The lenses prepared as described above were tested for colorfastness and for environmental stability. The "unblocked" lenses identified in the following tables are identical to the "blocked" lenses except that the unblocked lenses do not contain Tinuvin®328. The "gray" and "brown" lenses differ only in the color of the polarizing film used to make the laminate. Some of the lenses tested were commercially available, as indicated.

To test for colorfastness, half of a lens was irradiated at 0.47 watts/m$^2$ UVA for 60 hours (the unirradiated side is shielded) at about 50% relative humidity. The temperature was maintained at 63° C. The lens was removed from the testing chamber and under 40 watt fluorescent light, inspected for changes in color, fading or degradation.

The environmental stability test was conducted by placing a finished lens into a closed chamber with a cavity temperature of 200° F. for 96 consecutive hours. The lens is then cooled for approximately 1 day and examined for cosmetic and functional defects. The defects may be loss of polarizing efficiency, chips, fractures, distortion, looseness and gaps.

TABLE 1

Loss in Polarization Efficiency (%) After Testing

|  | Environmental Test | Colorfastness |
|---|---|---|
| Brown Unblocked | 3.24 | 0.40 |
| Gray Unblocked | 0.02 | 0.02 |
| Brown Blocked | 7.02 | 0.05 |
| Gray Blocked | 0.03 | 0.02 |
| Commercial Lens #1 | 90.83 | 6.46 |
| Commercial Lens #2 | 39.67 | 3.12 |

TABLE 2

Increase in % Transmittance After Testing

|  | Environmental Test | Colorfastness |
|---|---|---|
| Brown Unblocked | 1.40 | 5.00 |
| Gray Unblocked | 1.15 | 2.98 |
| Brown Blocked | 1.53 | 1.50 |
| Gray Blocked | 1.68 | 0.77 |
| Commercial Lens #1 | 18.63 | 5.26 |
| Commercial Lens #2 | 13.03 | 2.80 |

TABLE 3

Increase in UVA % Transmittance

|  | Environmental Test | Colorfastness |
|---|---|---|
| Brown Unblocked | 1.86 | 4.87 |
| Gray Unblocked | — | 2.33 |
| Brown Blocked | 0 | 0.03 |
| Gray Blocked | 0 | 0 |
| Commercial Lens #1 | 0.5 | 0.10 |
| Commercial Lens #2 | 0.47 | 0.20 |

I claim:

1. An improved sunglass lens laminate comprising:
   a first lens portion,
   a second lens portion, and
   an adhesive binding the first and second lens portions together,
   the improvement comprising incorporating sufficient ultraviolet absorber into the adhesive to block substantially all of the UVA radiation in sunlight.

2. The lens of claim 1 wherein the lens further comprises a polarizing film adhered between the first and second lens portions.

3. The lens of claim 1 wherein the adhesive contains a photoinitiator.

4. The lens of claim 3 wherein the adhesive contains an ultraviolet photoinitiator.

5. The lens of claim 3 wherein the adhesive contains a visible light photoinitiator.

6. The lens of claim 1 wherein the ultraviolet absorber is selected from the group consisting of benzotriazoles and benzotriazole derivatives.

7. The lens of claim 1 wherein the amount of ultraviolet absorber incorporated in the adhesive is sufficient to block at least 99.9% of the UVA radiation in sunlight.

8. The lens of claim 1 wherein the amount of ultraviolet absorber incorporated in the adhesive is within the range from about 1.25 to about 5% by weight.

9. The lens of claim 1 wherein the amount of ultraviolet absorber incorporated in the adhesive is within the range from about 1.5 to about 2.5% by weight.

10. The lens of claim 1 wherein at least one of the lens portions is made from glass.

11. The lens of claim 1 wherein both of the lens portions are made from glass.

12. The lens of claim 1 wherein the temperature of the cure process performed to bind the lens portions together does not exceed 140° F.

13. The lens of claim 1 wherein the temperature of the cure process performed to bind the lens portions together does not exceed 120° F.

14. An improved polarized sunglass lens laminate comprising:
    a first lens portion,
    a second lens portion,
    a polarizing film disposed between the first and second lens portions, and
    an adhesive binding the two lens portions and the polarizing film together,
    the improvement of which comprises incorporating sufficient ultraviolet absorber into the adhesive to block substantially all of the UVA radiation in sunlight.

15. The lens of claim 14 wherein the adhesive comprises a visible light photoinitiator and visible light is used during the cure process performed to bind the two lens portions and the polarizing film together.

16. The lens of claim 15 wherein the adhesive is a urethane modified acrylic.

17. The lens of claim 15 wherein the temperature does not exceed 140° F.

18. The lens of claim 15 wherein the temperature does not exceed 120° F.

19. The lens of claim 15 wherein the amount of ultraviolet absorber incorporated in the adhesive is sufficient to block at least 99.9% of the UVA radiation in sunlight.

20. The lens of claim 15 wherein the amount of ultraviolet absorber incorporated in the adhesive is within the range from about 1.25 to about 5% by weight.

21. The lens of claim 15 wherein the amount of ultraviolet absorber incorporated in the adhesive is within the range from about 1.5 to about 2.5% by weight.

* * * * *